G. M. JACKSON.
STOCK MARKER.
APPLICATION FILED JAN. 31, 1907.
915,355.
Patented Mar. 16, 1909.
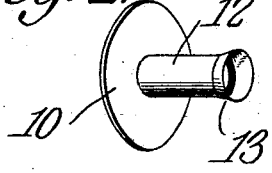
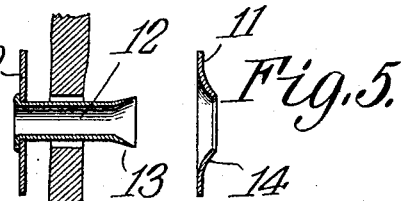
WITNESSES:
E. F. Stewart
Herbert Lawson.
George M. Jackson, INVENTOR
By C. A. Snow & Co.
ATTORNEYS

UNITED STATES PATENT OFFICE.

GEORGE M. JACKSON, OF ST. LOUIS, MISSOURI.

STOCK-MARKER.

No. 915,355.  Specification of Letters Patent.  Patented March 16, 1909.

Application filed January 31, 1907. Serial No. 355,113.

*To all whom it may concern:*

Be it known that I, GEORGE M. JACKSON, a citizen of the United States, residing at St. Louis, in the county of St. Louis City and State of Missouri, have invented a new and useful Stock-Marker, of which the following is a specification.

The invention relates to stock markers, and has for its object to provide a device of that type wherein two disks or buttons adapted to be arranged on opposite sides of the ear of the animal are connected by a shank extending through the ear, wherein the opening or perforation in the ear for the reception of the shank is formed by the shank itself after which the free end of the shank is upset against the outer surface of the loose button, and particularly to provide a device of this type wherein the opening or perforation formed in the ear of the animal is larger in diameter than the shank, or that portion of the shank which is to occupy permanently the opening or perforation to avoid pressure against the cut portion of the ear and thus permit the ear to heal.

Moreover, it is an object of the invention to provide a device of this kind wherein the shank is free to move in the opening or perforation in the ear to permit the button which is affixed to the shank to rock, and wherein the initially unattached button or disk which is secured to the free end of the shank after the latter has been inserted in the ear of the animal is free to rock independent of the shank to avoid pressure on the ear, to enable the device to accommodate itself readily to movements, and, also, to enable the device to free itself readily from wires, brush, and so forth with which it may come into contact, and hence avoid the inconveniencing of the animal and reduce to a minimum the risk of having the marker detached or displaced from the ear of the stock.

Further objects and advantages of the invention will appear in the following description, and it will be understood that various changes in the form, proportions, size and minor details of the construction may be made without departing from the spirit or sacrificing any of the advantages of the invention, as defined by the appended claims.

In the accompanying drawings:—Figure 1 is a perspective view of a marker constructed in accordance with the invention. Figs. 2 and 3 are detail views, respectively, of the members prior to their being joined. Fig. 4 is a longitudinal sectional view in detail of the shank member. Fig. 5 is a similar view of the loose button. Fig. 6 is a similar view of the two members joined as when in use. Fig. 7 is a side view of the members joined to show that there is sufficient looseness between the detachable member and the shank to permit a considerable rocking movement.

Similar numerals of reference are employed to indicate corresponding parts throughout the several figures of the drawings.

The device consists of what for convenience may be termed the fast button 10 and a loose button 11 which are connected when in use by a hollow shank 12, said shank being firmly attached at one end to the fast button 10 and being of uniform diameter for a considerable portion of its length and then being flared or enlarged, as shown at 13, and reduced to a cutting edge at the end, so that it will by contact with the ear of the stock cut its own way through the ear. As the shank is passed through the ear, however, the flared or enlarged portion passes beyond the surface of the ear, or, in other words, passes out of the opening which the shank has formed, so that the smaller or reduced portion of the shank fits in the opening or perforation in the ear of tne animal to permit free rocking movement of the fast button and shank, and, also, relieve the sides of the opening formed in the ear to permit circulation and the access of air, so that the ear will heal, it being a recognized fact with reference to devices of this class, that if the ear is kept sore by the constant pressure of the parts of the marker thereon, the animal is seriously inconvenienced and the button is liable to ultimately drop out. The opening in the loose button is of a size to just fit the enlarged cutting extremity of the shank, and is dished or concaved as at 14 to center the cutting end of the shank and facilitate the passage of the cutting end through the opening in the loose button, and after the shank has been passed through the opening in the loose button it is upset or spread to engage the exterior surface of the button around the opening, and in contact with the convexed surface of the button. In thus upsetting the end of the shank, however, the opening in the loose button is positioned upon the reduced portion of the shank, so that as the opening is larger than the reduced portion of the shank, the button is free to rock or to be deflected almost to the extent of forty-five degrees from the plane of the fast button, so as to permit a similar rocking of the shank to enable the device to readily free itself from any contacting objects, such as wire, brush, and so forth.

In practice, the marker is applied to the ear of the stock by means of a special tool provided for that purpose, somewhat in the nature of a pair of pliers constructed, respectively, to hold the two members so that they may be positioned upon opposite sides of the plane of the ear, and upon operating the tool the ear is punctured and the end of the shank is upset outside of the loose button, as hereinbefore explained, in one operation. As the tool forms no part of the present invention, however, it is deemed unnecessary to illustrate it. Obviously the marker may be made of any suitable material and of various sizes to suit different kinds of stock, it being desirable under ordinary conditions to use a smaller marker upon such stock as sheep and goats, while a larger one may be employed upon cattle.

I claim:—

1. A stock marker comprising a shank having one end provided with a cutting edge, and a pair of disks mounted upon the shank, one of which is capable of rocking movement with reference to the other.

2. A stock marker comprising a shank having one end provided with a cutting edge, and a pair of disks mounted on the shank, one of which is loose thereon.

3. A stock marker comprising a shank having one end flared and provided with a cutting edge, and a pair of disks mounted on the shank one of which is longitudinally slidable thereon.

4. A stock marker comprising a shank having one end flared and provided with a cutting edge, and a pair of disks mounted on the shank, one of which is fixed and the other loose thereon.

5. A stock marker comprising a shank and disks thereon, the shank being projected through one of the disks and flared and provided with a cutting edge.

6. A stock marker comprising a shank having a cutting terminal of greater diameter than the shank, and disks mounted on the shank, one of which is loose thereon.

7. A stock marker embodying disks and a tubular shank connecting the same, one end of the latter being provided with a cutting edge of a diameter greater than the body of the shank.

8. A stock marker embodying a shank flared at one end to form a cutting edge of greater diameter than the body of the shank, and disks on the shank, one of which is fixed relatively thereto.

9. A stock marker embodying a tubular shank provided at one end with a flared cutting edge, and two disks, one of which is fixed and the other loose on the shank, the loose disk having a shank receiving opening of a diameter equal to the cutting edge.

10. A stock marker embodying a shank provided at one end with a flared cutting edge, and two disks, one of which is fixed and the other loose on the shank, the latter disk being dished around the shank receiving opening.

11. A stock marker comprising a shank having one end provided with a cutting edge, and a pair of disks mounted on the shank one of which is loose thereon and is outwardly dished.

In testimony that I claim the foregoing as my own, I have hereto affixed my signature in the presence of two witnesses.

GEORGE M. JACKSON.

Witnesses:
E. HUME TALBERT,
C. E. PREINKERT.